V. P. CORBETT.
Potato Digger.
No. 83,833.  Patented Nov. 10, 1868.
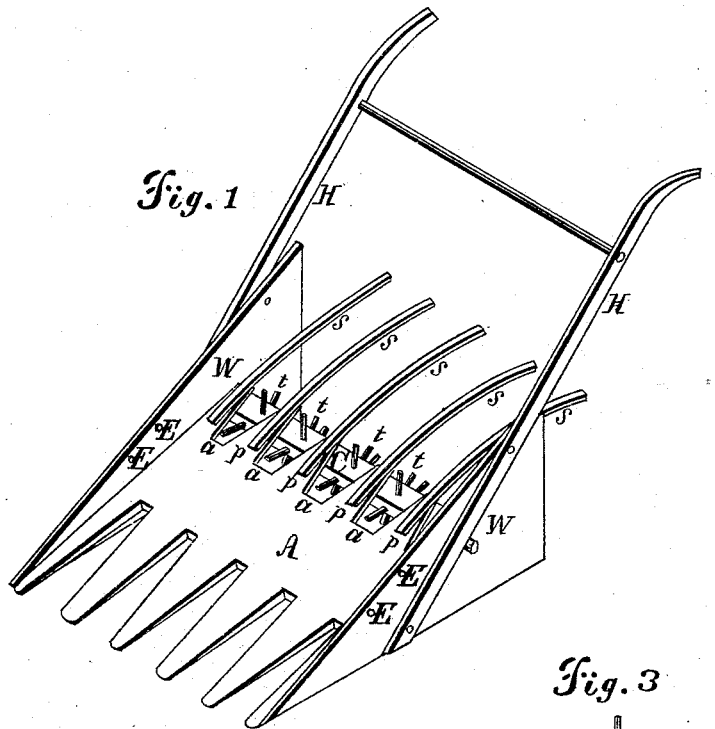
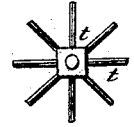
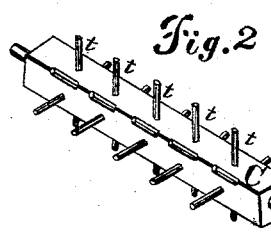
WITNESSES:
INVENTOR:

VIRGIL P. CORBETT, OF ALEXANDRIA COUNTY, VIRGINIA.

Letters Patent No. 83,833, dated November 10, 1868; antedated October 31, 1868.

IMPROVEMENT IN POTATO-DIGGER.

The Schedule referred to in these Letters Patent and making part of the same.

*To all whom it may concern:*

Be it known that I, VIRGIL P. CORBETT, of Alexandria county, State of Virginia, have invented certain new and useful Improvements in Potato-Diggers; and I do hereby declare that the following is a full, clear, and exact description of the construction and operation of the same, reference being had to the accompanying drawings, making a part of this specification, in which—

Figure 1 is an isometrical perspective view of the potato-digger;

Figure 2, a separate view of the toothed cylinder or stirrer; and

Figure 3, an end view of the same.

This invention consists in the employment of a winged scoop or shovel, with vibrating rods or bars attached, in combination with a toothed cylinder or stirrer, for the purpose of digging potatoes, and separating the earth therefrom, depositing them on the surface of the ground, as herein set forth.

In fig. 1, the scoop or shovel, A, is represented as having the front edge divided into several prongs, for the purpose of entering the ground easily, especially where the same may be rough and stony.

The shovel is placed at such an inclination to the surface of the ground that the earth and potatoes may slide easily up the inclined plane, till they come to the openings *a a a*, in the back edge of the scoop, which openings are wide enough to allow the fine earth to fall through, but too narrow to let the potatoes through. Under these openings is placed the revolving cylinder or bar, having the teeth or pins *t t t* so arranged as to come up through the openings *a a a*, as the bar C revolves.

Between the openings *a a a*, and attached to the prongs *p p p*, are vibrating rods or bars *s s s*, made of steel, or other substance having sufficient elasticity, and extending back as far as may be desirable. These bars are for the purpose of still further stirring and separating the potatoes from the earth.

The wings W W support the scoop *c* and revolving bar or cylinder C, and guide the earth and potatoes, till they pass out at the rear end.

As the digger or plow is drawn forward, by rods attached to the wings at E E, like an ordinary scraper, the earth and potatoes are forced up the inclined surface of the scoop, till they come to the openings at *a a a*, where they come in contact with the teeth of the revolving bar or cylinder C, which is forced to revolve, causing the finer particles of earth to fall through, and the potatoes and coarser earth to pass back over the spring-bars *s s s*. The vibration of these rods still further agitates the earth, and causes its separation from the potatoes, till they pass off at the rear end, and are deposited on the surface of the ground.

What I claim as my invention, and desire to secure by Letters Patent, is—

The arrangement and combination of the revolving toothed cylinder or bar C, scoop A, with pronged front spring-bars *s s s*, and wings W W, constructed and operating substantially as and for the purposes set forth.

V. P. CORBETT.

Witnesses:
 N. DuBois,
 CHARLES HERZOG.